United States Patent [19]

Booth, Jr. et al.

[11] 4,286,967
[45] Sep. 1, 1981

[54] DOUBLE CRYSTALLIZATION PROCESS TO PRODUCE LOW ORGANIC, LOW SILICA SODA ASH

[75] Inventors: Elwood F. Booth, Jr., Liverpool; Rustom P. Poncha, Syracuse, both of N.Y.

[73] Assignee: Allied Chemical Corporation, Morris Township, Morris County, N.J.

[21] Appl. No.: 163,848

[22] Filed: Jun. 27, 1980

[51] Int. Cl.³ .............................................. C30B 9/02
[52] U.S. Cl. ...................................... 23/298; 23/301; 23/302 T
[58] Field of Search ................. 23/301, 302 T, 298; 423/206 T

[56] References Cited

U.S. PATENT DOCUMENTS

| 3,838,189 | 9/1974 | Sopchak et al. | 423/206 T |
| 3,904,733 | 9/1975 | Gancy et al. | 423/206 T |
| 4,158,043 | 6/1979 | Gloster | 423/206 T |

*Primary Examiner*—Hiram Bernstein
*Attorney, Agent, or Firm*—Thomas D. Hoffman

[57] ABSTRACT

A process for the production of low organic, low silica, anhydrous sodium carbonate comprising (a) calcining raw trona ore to produce crude sodium carbonate containing soluble and insoluble impurities, (b) admixing said crude sodium carbonate with a substantially saturated sodium carbonate solution to produce sodium carbonate monohydrate crystals containing insolubles and an impure sodium carbonate solution; (c) separating these monohydrate crystals and impurities; (d) dissolving the monohydrate crystals to produce a substantially saturated sodium carbonate solution and insolubles; (e) separating said solution from the insolubles; (f) evaporative crystallization of the separated saturated sodium carbonate solution to produce pure sodium carbonate monohydrate crystals; (g) optionally, subjecting the crystals recovered in step (f) to steps (d-f) once, but no more than once; (h) heating said monohydrate crystals to obtain low organic, low silica, anhydrous sodium carbonate product particles; and (i) optionally, repeating the sequence defined by steps (b-h) once, but no more than once is disclosed.

17 Claims, 1 Drawing Figure

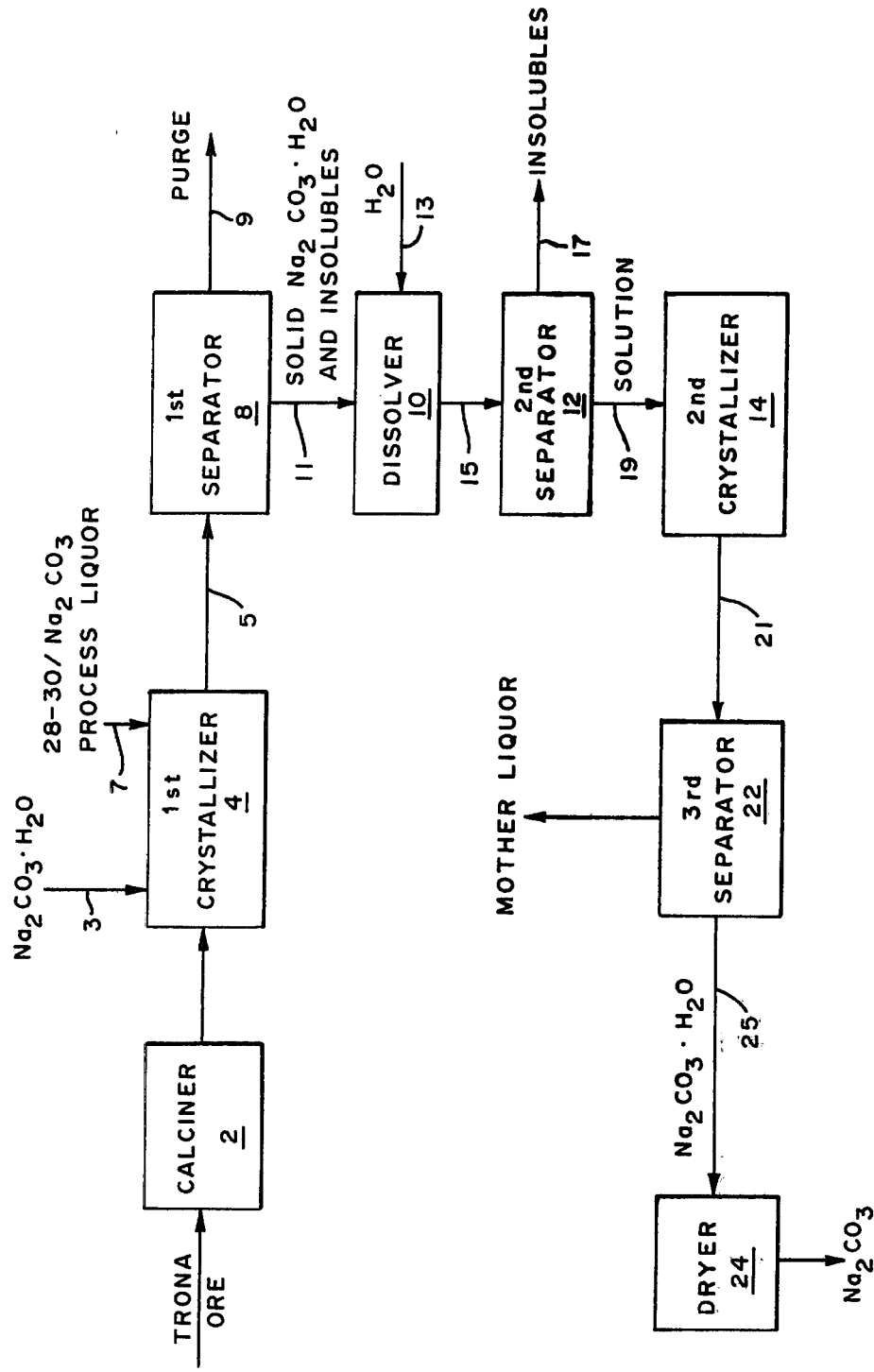

DOUBLE CRYSTALLIZATION PROCESS TO PRODUCE LOW ORGANIC, LOW SILICA SODA ASH

DESCRIPTION

BACKGROUND OF THE INVENTION

This invention relates to a trona crystallization process and more particularly this invention relates to a double crystallization process to produce low organic, low silica anhydrous sodium carbonate.

Trona as found in the Green River area of Wyoming consists mainly of sodium sesquicarbonate ($Na_2CO_3 \cdot NaHCO_3 \cdot 2 H_2O$). A typical analysis of trona contains

| Constituent | Weight Percent |
|---|---|
| $Na_2CO_3$ | 45 |
| $NaHCO_3$ | 36 |
| $H_2O$ | 15.30 |
| NaCl | 0.04 |
| $Na_2SO_4$ | 0.01 |
| $Fe_2O_3$ | 0.14 |
| Organic Matter | 0.30 |
| Insolubles | 3.20 |

In addition to the water insoluble fraction resulting from the association of the trona with shale in the trona deposits, organic matter in the order of about 0.3 percent is present which would contaminate the desired product, e.g., sodium carbonate precursor crystals, unless it is removed. It is believed that the organic matter in trona consists of kerogenaceous material containing monocarboxylic acids, dicarboxylic acids, certain unsaturated acids steroids and certain rosin acids.

Furthermore, in order to improve the desired physical properties of the sodium carbonate precursor crystals, it is customary to add to the solution to be crystallized, organic surface active agents, such as alkylated benzene sulfonate, as crystallization modifiers or foam depressers to improve crystallization. Likewise, organic defoaming agents and other organic impurities picked up in the circulating process liquors in the plant are present in the solution prior to and during crystallization. The presence of these organics to any appreciable extent is not desired because they adversely affect the crystal quality, e.g., discoloration of the crystal and reduction in bulk density, which may limit the extent of use of the precursor crystals, particularly if they are to be converted to dense soda ash for use in the production of sodium tripolyphosphate. Various methods previously have been proposed to reduce organics to an acceptable level so as not to adversely affect the crystal quality. For instance, in U.S. Pat. Nos. 2,962,348 and 3,131,996 the crude trona is decarbonized at relatively high temperatures. These patents disclose that at temperatures in the order of about 400° to 800° C., the organic matter present in the crude trona is substantially removed as it is converted to a less soluble state which, as such, is removed in the subsequent steps of dissolving, clarifying and filtration prior to crystallization. This method, of course, would involve a high heat requirement, thus increasing the cost of the ultimate product. Also, heating the trona in excess of 400° C., while eliminating substantial amounts of the carbon in the crude trona, substantially increases the quantity of water-soluble silica in the crude sodium carbonate, the removal of which is difficult, requiring the bleeding off of substantial amounts of the mother liquor separated from crystallizers. This bleeding off results in the loss of soluble carbonate values in the discarded mother liquor.

Another method proposed is that described in U.S. Pat. No. 3,028,215, wherein the sodium carbonate precursor containing organic impurities is subjected to a high temperature calcination, i.e., temperatures in the order of about 400° C. to 800° C., wherein the organic impurities are either volatilized or converted to a coke which allegedly does not present any problem in the utilization of the resulting soda ash in commerce. However, the crystal quality is not significantly improved because the organics are present during crystallization at which time their adverse effect is realized on the quality of the crystal produced during the crystallization. Also, the equipment and heat requirements to calcine the contaminated sodium carbonate precursor crystals are significant, particularly when the production rate is in the magnitude of more than 1,000 tons of product per day.

Still another method for reducing organics is that described in U.S. Pat. No. 3,260,567, wherein the crude trona is first converted to crude sodium carbonate at relatively low temperatures, i.e., in the order of about 150° to 200° C., and then the crude sodium carbonate is dissolved in aqueous solution. After removal of the solubles by clarification, the organics are substantially reduced by passing a solution of crude sodium carbonate through a bed of adsorbent, such as activated carbon, prior to crystallization. After crystallization the mother liquors are recycled through the adsorbent beds to reduce the build up of organics in the mother liquor streams prior to a second crystallization. While there is little, if any, necessity to bleed off any mother liquor due to organic build up in the recycled mother liquor, special equipment is necessary to reactivate the large amounts of the activated carbon when it no longer effectively performs its function. Also, there is needed to effect this operation an increase in the necessary processing equipment due to the large volumes of liquid, i.e., fresh feed solution as well as recycled mother liquor to be handled.

Other trona crystallization processes are described in U.S. Pat. Nos. 3,653,848, and 3,705,790.

While these patents disclose crystallization processes to produce soda ash, all involve elaborate processing techniques which require substantial cost and capital equipment, energy, additives and consumption of time. Thus, there still is a need for a simple, low energy process to convert impure trona ore containing soluble and insoluble impurities into pure soda ash. A low organic, low silica soda ash product would be particularly desirable.

Accordingly, it is an object of the present invention to provide a low energy process which produces low organic, low silica soda ash without employing chemical additives or foam depressors.

SUMMARY OF THE INVENTION

In accordance with the present invention there is provided a process for the production of low-organic, low silica anhydrous sodium carbonate, which comprises:

(a) calcining raw trona ore to produce a crude sodium carbonate containing soluble and insoluble impurities;

(b) admixing said crude sodium carbonate with a substantially saturated aqueous sodium carbonate solution to form sodium carbonate monohydrate crystals and insoluble impurities and a sodium carbonate solution containing soluble impurities;

(c) separating said sodium carbonate monohydrate crystals and insoluble impurities from said sodium carbonate solution;

(d) admixing said sodium carbonate monohydrate crystals and insoluble impurities with water in an amount sufficient to form a substantially saturated aqueous carbonate solution and insoluble impurities;

(e) separating said solution from said insoluble impurities;

(f) evaporating said solution to form sodium carbonate monohydrate crystals;

(g) optionally, subjecting the crystals recovered from step (f) to steps (d-f) once, but no more than once;

(h) heating sodium carbonate monohydrate crystals to obtain low organic, low silica anhydrous sodium carbonate; and (i) optionally, repeating the sequence defined by steps (b-h) once, but no more than once.

DESCRIPTION OF THE DRAWINGS

The sole FIGURE is a schematic of the double crystallization process of the present invention.

DETAILED DESCRIPTION OF THE INVENTION

The invention is better understood by reference to the drawing which represents the schematic of a preferred form of the present invention. Crude trona ore is feed to calciner 2 wherein the crude trona is heated at a temperature of 150° to 200° C. for a time sufficient to convert the trona ore into crude sodium carbonate containing water solubles and water insolubles by driving off water vapor and carbon dioxide. This crude product is then fed to a grinder (not shown) wherein the crude sodium carbonate is ground and screened to give particles in the range of less than about 16 mesh to less than about 300 mesh, preferably 100 mesh to about 300 mesh. All mesh sizes are U.S. standard. This finely ground crude sodium carbonate containing water soluble and water insoluble impurities is then fed to a first crystallizer 4, containing sodium carbonate monohydrate seed crystals which are fed to crystallizer 4 via line 3 and, also containing substantially saturated, conveniently 28 to 30 percent by weight sodium carbonate process liquor fed at a temperature of about 80°-100° C. to 4 from separator 8 via line 7 and containing about 600-3500 ppm, generally about 780 to 2600 ppm $SiO_2$ (basis $Na_2CO_3$) and about 100 to 500 ppm, generally about 160 to 310 ppm organics as carbon (basis $Na_2CO_3$). In addition to the ground crude sodium carbonate, calciner dust removed from 2 can also be added directly to the first crystallizer 4 when trona ore is heated in a rotary calciner. When trona ore is calcined in rotary calciners, about 25 to 30 percent weight of the calcined ore is in the form of fine calciner dust. By employing calciner dust in the process of the present invention, the crushing and screening of calciner discharge can be significantly reduced. The slurry so formed in the first crystallizer 4 was stirred continuously while a temperature of between about 80° and about 100° C., usually 95° to 100° C. was maintained therein. A portion of the heated slurry was continuously removed via line 5 to first separator 8 wherein a 30 percent by weight sodium carbonate solution containing soluble and insoluble impurities is purged via line 9 and crystalline sodium carbonate monohydrate and insolubles are removed via line 11 to dissolver 10. Water is added via line 13 to dissolver 10 maintained at a temperature of about 80° to 100° C. usually 95°-100° C. to form a substantially saturated i.e., about 28 to 30 percent by weight, sodium carbonate solution and insoluble solids. This sodium carbonate solution and, insolubles were fed via line 15 to second separator 12; the insolubles were removed via line 17 and the substantially saturated sodium carbonate solution fed via line 19 to second crystallizer 14 maintained at a temperature in the range of about 36° to about 109° C., preferably 70° to 109° C., and, employing reduced pressure as required. The monohydrate slurry so formed was transferred from 14 via line 21 to a third separator 22 wherein the sodium carbonate monohydrate crystals were separated from the mother liquor and passed via line 25 to dryer 24 from whence the low silica, low organic, anhydrous sodium carbonate having a bulk density of greater than about 1,000 grams per liter was recovered.

While the sodium carbonate monohydrate crystals from third separator 22 have acceptably low impurity levels, it is a specific feature of the present invention that the sodium carbonate monohydrate crystals from third separator 22 can optionally be recycled to dissolver 10, then to second separator 12, second crystallizer 14, and third separator 22 whenever further improvement in the organic and/or silica impurity levels is desirable.

Dryer 24 can be of any convenient design, e.g. steamed tube dryers, direct fired rotation calciners, which are conveniently used to convert the monohydrate crystals to pure dense soda ash. The anhydrous sodium carbonate produced by the double crystallization process of the present invention contained only about ⅓ of the amounts of organics and silica present in anhydrous carbonate produced by prior art methods. Since the crystallization process of the present invention can operate without employing antifoamers and defoamers contamination by these agents was avoided. The low silica, low organic anhydrous sodium carbonate produced in accordance with the present invention is suitable for production of sodium tripolyphosphate and may also be used as a food grade soda ash product.

Usually, carrying out the sequence of steps for the double crystallization process of the present invention as indicated in the accompanying drawing only once is sufficient to produce sodium carbonate particles having acceptably low organic level, i.e. less than about 35 ppm carbon, (basis $Na_2CO_3$) and acceptably low silica level, i.e. less than about 30 ppm $SiO_2$ (basis $Na_2CO_3$) and to achieve the benefit of this low energy process. However, it is a special feature of the present invention that the sequence of steps (b-h) described above and indicated in FIG. 1 from first crystallizer 4 to recovery of anhydrous sodium carbonate from dryer 24 can be carried out twice to improve the organic and silica impurity levels. Further, it is also contemplated to be within the scope of the present invention to recycle the monohydrate crystals from third separator 22 to dissolver 10, as described above, while the sequence of steps which comprise the double crystallization process is carried out two times. Of course, usually this sequence of steps would be performed only once, and conveniently in separate equipment.

It is to be understood that the second crystallizer 14 can be replaced by first, second, and third effect crystallizers as described in U.S. Pat. No. 3,705,790 issued Dec. 12, 1972, which is hereby incorporated by reference.

Crystallization of sodium carbonate monohydrate in the second crystallizer can also be affected at temperatures ranging from about 36° to about 109° C. For best results it has been found in the monohydrate process implying multiple effect evaporator crystallizer be maintained between approximately about 70° to about 109° C., preferably at a temperature of about 85° to about 109° C., the second effect evaporator crystallizer maintained at a temperature of about 53° to about 99° C., preferably at a temperature of about 68° to about 96° C. and the third effect evaporator crystallizer maintained at a temperature of about 36° to about 85° C., preferably at a temperature of about 50° to 79° C. Exemplary disclosures of the monohydrate process in which the crystallization procedure of the present invention may be applicable may be found in U.S. Pat. Nos. 2,343,081, 2,962,348, 3,131,996 and 3,260,567.

Calcined trona ore, having a particle size finer than 16 mesh can be employed in the process of the present invention to produce low organic, low silica, anhydrous sodium carbonate having a bulk density greater than about 1,000 g/l. In one embodiment, low organic, low silica anhydrous sodium carbonate having a bulk density greater than about 1,000 g/l was produced when the calcined trona ore used in the process of the present invention was ground and screened to give a pulverized calcined trona having a mesh less than about 16 mesh (−16 mesh), preferably in the range of less than about 16 mesh to less than about 300 mesh, more preferably in the range of less than about 100 mesh to about 300 mesh. It was discovered when calcined trona ore coarser than 10 mesh was fed to crystallizer 4, the rejection of impurities in the first crystallization step was unacceptably low and, the quality of the crystals of sodium carbonate monohydrate was unsatisfactory. It was also discovered that there was no improvement in rejection of impurities and in the quality of monohydrate crystals when calcined trona ore ground finer than 300 mesh was used in the process of the present invention; costs associated with grinding and handling finely ground calcined trona ore of less than about 300 mesh makes the use of particles finer than about 300 mesh in the process of the present invention economically unattractive. However, calciner dust, having a particle size of less than 300 mesh was used in the crystallization process of the present invention to produce low organic, low silica anhydrous sodium carbonate having a bulk density of greater than about 1,000 g/l. Since calciner dust often comprises about 25 to 30 weight percent of the trona ore recovered from rotary calciners, and since no grinding thereof is necessary, calciner dust is an economically attractive feed for the process of the present invention. Usually at least about 50 weight percent of unpulverized calcined trona ore will pass through a 16 mesh screen and these calcined trona particles of less than 16 mesh were used in the crystallization process of the present invention to produce low organic, low silica, anhydrous sodium carbonate having a bulk density greater than about 1,000 g/l.

Thus, by employing calciner dust or pulverized calcined trona ore of less than 16 mesh in the present invention grinding costs were reduced without adversely effecting product purity.

The sodium carbonate monohydrate crystals recovered from the third separator after the evaporative crystallization step usually contained about 30 to about 200 ppm, preferably less than about 50 ppm, more preferably less than about 30 ppm silica ($SiO_2$), (basis $Na_2CO_3$) and about 30 to about 70 ppm, preferably less than about 40 ppm, more preferably less than about 35 ppm organics as carbon (basis $Na_2CO_3$). Sodium carbonate monohydrate crystals were converted into anhydrous sodium carbonate having a bulk density of greater than about 1000 g/l; the levels of silica and organics as carbon in the sodium carbonate remained unchanged from that reported for the monohydrate.

The following examples represent preferred embodiments of the present invention.

EXAMPLE NO. 1

Calcined trona ore was dissolved in water at 95° C. and filtered to give a 30 percent by weight sodium carbonate process solution containing 1310 ppm $SiO_2$ (basis $Na_2CO_3$ and 148 ppm organic impurities as carbon (basis $Na_2CO_3$). To a one liter beaker was added a mixture of 600 ml of this 30% sodium carbonate process solution and 520 grams of sodium carbonate monohydrate seed crystals; the temperature of this mixture was maintained at 95° C. There was added to first crystallizer maintained at 95° C., 8500 grams of trona ore calcined at 180° C., pulverized to less than 100 mesh and having 796 ppm silica, $SiO_2$ (basis $Na_2CO_3$) and 174 ppm organics as carbon, (basis $Na_2CO_3$), at a rate of 8 g/m and a stream of the 30% sodium carbonate process solution containing impurities and monohydrate seed crystals at a rate of 15 g/min. The slurry so formed was stirred continuously and, 400 ml of the slurry was collected every thirty minutes by withdrawing the slurry at the rate of 6.7 ml every thirty seconds. 3800 grams of the solids were separated from the solution by centrifugation. A portion of these solids was analyzed and found to contain 350 ppm $SiO_2$ (basis $Na_2CO_3$) and 38 ppm organics as carbon, (basis $Na_2CO_3$) and 30% by weight insolubles (basis $Na_2CO_3$). The remainder of the solids was dissolved in water at 95° C. to give a 30% by weight sodium carbonate solution and insolubles. The insolubles were filtered off and the filtrate evaporated in a crystallizer at 70° C. under a reduced pressure of 80 kilo pascals to give sodium carbonate monohydrate crystals having 27 ppm $SiO_2$ (basis $Na_2CO_3$) and 33 ppm organics as carbon (basis $Na_2CO_3$). The results are summarized in the table below.

TABLE I

| Substance | Silica $SiO_2$ (ppm) | Organics as Carbon (ppm) |
| --- | --- | --- |
| Calcined Trona | 796 | 174 |
| First crystallization product* | 350 | 38 |
| Second crystallization product [$Na_2CO_3 \cdot H_2O$] | 27 | 33 |

*Based on analysis of filtered solution

EXAMPLE NO. 2

Unpulverized calcined trona was separated through a 16 mesh screen to give approximately 51 weight percent of less than 16 mesh calcined trona ore containing 2600 ppm $SiO_2$ (basis $Na_2CO_3$) and 211 ppm organics as carbon (basis $Na_2CO_3$). These coarse particles of trona ore (−16 mesh) were dissolved (95° C.) in the 30% by weight sodium carbonates process solution containing impurities of silica (1310 ppm, basis $Na_2CO_3$) and organics (148 ppm, basis $Na_2CO_3$) and, in addition to seed crystals of sodium carbonate monohydrate. Crystalline sodium carbonate monohydrate containing insolubles was removed and dissolved in water at 95° C. the insolubles comprising 9% by weight were filtered off and the filtered solution analyzed to show the solution contained 509 ppm $SiO_2$ (basis $Na_2CO_3$) and 60 ppm organics as carbon (basis $Na_2CO_3$). Thus, compared to Example 1, this coarser calcined trona ore feed gave a significant reduction in organics (72%) and silica (80%).

EXAMPLE NO. 3

This Example is similar to Example No. 2 except that the filtered solution is evaporated in a crystallizer as described in Example 1 to give sodium carbonate monohydrate crystals of improved purity.

EXAMPLE NO. 4

This Example is similar to Example 3 except that the sodium carbonate monohydrate crystals are dissolved in water at 95° C., to form a solution and insolubles; the insolubles are filtered and the filtered solution is evaporated to give sodium carbonate monohydrate crystals having impurity levels similar to those in Table I.

EXAMPLE NO. 5

This Example demonstrates the use of calciner dust in the crystallization process of the present invention. 3000 grams of calciner dust containing 2400 ppm $SiO_2$ (basis $Na_2CO_3$) and 298 ppm organics as carbon (basis $Na_2CO_3$) were fed to the monohydrate crystallizer described in Example 1. The crude monohydrate crystals containing insolubles were dissolved in water at 95° C. to give a 30% sodium carbonate solution. The insolubles were filtered off and the solution analyzed to contain 174 ppm $SiO_2$ (basis $Na_2CO_3$) and 59 ppm organics as carbon (basis $Na_2CO_3$). While the evaporative crystallization step described in Example 1 was not performed, the sodium carbonate monohydrate crystals would probably contain about 50 to 52 ppm organics as carbon. It is note worthy that although the silica and the organic impurities were greater in the calciner dust than they were in the calcined trona employed in Example 1, the product recovered from the first crystallization of calciner dust showed a higher rejection of silica (93%) and organics (80%) than that observed in Example 1.

EXAMPLE NO. 6

This Example is similar to Example 1 except that the first and second crystallization steps are carried out twice.

EXAMPLE 7

This Example is similar to Example 6 except that the second crystallization step is repeated in second sequence.

What is claimed:

1. A process for the production of low organic, low silica, anhydrous sodium carbonate which comprises:
   (a) calcining raw trona ore to produce a crude sodium carbonate containing soluble and insoluble impurities;
   (b) admixing said crude sodium carbonate with a substantially saturated aqueous sodium carbonate solution to form sodium carbonate monohydrate crystals, insoluble impurities and a sodium carbonate solution containing soluble impurities;
   (c) separating said sodium carbonate monohydrate crystals and insoluble impurities from said sodium carbonate solution;
   (d) admixing said sodium carbonate monohydrate crystals and insoluble impurities with water in an amount sufficient to form a substantially saturated sodium carbonate solution and insoluble impurities.
   (e) separating said solution from said insoluble impurities;
   (f) evaporating said solution to form sodium carbonate monohydrate crystals;
   (g) optionally, subjecting the crystals recovered in step (f) to steps (d-f) once, but no more than once;
   (h) heating said sodium carbonate monohydrate crystals to obtain low organic, low silica, anhydrous sodium carbonate product particles; and
   (i) optionally, repeating the sequence defined by steps (b-h) once, but no more than once.

2. The process as described in claim 1 wherein the sequence defined by steps (b-h) is carried out once.

3. The process as described in claim 2 which further comprises including sodium carbonate monohydrate crystals in the admixture in step (b).

4. The process as described in claim 3 wherein the evaporation in step (f) is effected at a temperature in the range of about 36° to about 109° C.

5. The process as described in claim 1 wherein the sequence defined by steps (b-h) is carried out twice.

6. The process as described in claim 3 wherein the evaporation in step (f) is effected at a temperature in the range of about 70° to about 109° C.

7. The process as described in claim 2 wherein the raw trona is calcined at a temperature in the range of about 150° to about 200° C.

8. The process as described in claim 2 wherein step (g) is performed.

9. The process as described in claim 2 wherein step (g) is omitted.

10. The process as described in claim 5 wherein step (g) is performed.

11. The process as described in claim 5 wherein step (g) is omitted.

12. The process as described in claim 6 wherein the crude sodium carbonate admixed in step (b) is calciner dust.

13. The process as described in claim 6 which further comprises grinding the crude sodium carbonate to a particle size less than about 16 mesh.

14. The process as described in claim 6 wherein the ground trona ore has a mesh size in the range of about less than about 16 mesh to less than about 300 mesh.

15. The process as described in claim 6 wherein the ground trona ore has a mesh size between less than about 100 mesh and 300 mesh.

16. The process as described in claim 15 wherein the substantially saturated aqueous solution of sodium carbonate is a 28-30% by weight sodium carbonate process liquor containing soluble organic impurities as carbon in the range of about 100 to 500 ppm, basis $Na_2CO_3$.

17. The process as described in claim 16 wherein the process liquor further comprises 600 to 3500 ppm soluble silica, basis $Na_2CO_3$.

* * * * *